United States Patent
Takeda

(10) Patent No.: US 7,963,188 B2
(45) Date of Patent: Jun. 21, 2011

(54) INDUSTRIAL ROBOT HAVING A SUSPENDED UNIT

(75) Inventor: Shigeru Takeda, Okazaki (JP)

(73) Assignee: Denso Wave Incorporated, Tokyo (JP)

( * ) Notice: Subject to any disclaimer, the term of this patent is extended or adjusted under 35 U.S.C. 154(b) by 257 days.

(21) Appl. No.: 12/292,114

(22) Filed: Nov. 12, 2008

(65) Prior Publication Data

US 2009/0127957 A1    May 21, 2009

(30) Foreign Application Priority Data

Nov. 15, 2007   (JP) ................................ 2007-296800

(51) Int. Cl.
*B25J 17/00* (2006.01)
*B25J 17/02* (2006.01)
*B25J 18/00* (2006.01)
*F16H 27/02* (2006.01)
*F16H 29/02* (2006.01)
*F16H 29/20* (2006.01)

(52) U.S. Cl. .................. 74/490.01; 74/89.2; 74/490.03; 901/16; 901/23

(58) Field of Classification Search ............... 74/490.01, 74/490.02, 490.03, 490.08, 490.09, 89.2, 74/89.23, 502.6; 901/16, 19, 23; 59/78.1; 414/918

See application file for complete search history.

(56) References Cited

U.S. PATENT DOCUMENTS

| 4,534,006 | A  | * | 8/1985  | Minucciani et al. | .......... 700/249 |
| 4,571,149 | A  | * | 2/1986  | Soroka et al.     | .......... 414/749.1 |
| 4,968,924 | A  | * | 11/1990 | Mori et al.       | .......... 318/568.1 |
| 6,212,968 | B1 | * | 4/2001  | Hiruma et al.     | .......... 74/490.03 |
| 7,806,385 | B2 | * | 10/2010 | Takeda            | .......... 254/325 |
| 2009/0126598 | A1 | * | 5/2009 | Takeda           | .......... 105/148 |
| 2009/0127530 | A1 | * | 5/2009 | Takeda           | .......... 254/387 |
| 2009/0192775 | A1 | * | 7/2009 | Kamiya           | .......... 703/7 |
| 2010/0101360 | A1 | * | 4/2010 | Tokumitsu        | .......... 74/490.06 |

FOREIGN PATENT DOCUMENTS

JP   A-54-118056   9/1979
JP   A-59-129677   7/1984

* cited by examiner

*Primary Examiner* — Justin Krause
(74) *Attorney, Agent, or Firm* — Oliff & Berridge, PLC

(57) ABSTRACT

Since the rotating unit is disposed so that the drive part, which constitutes the rotating unit, is located in the inner side of the bent portion with the curved surface of the CABLEVEYOR in the side of the straight axis, there is no problem occurs by locating the drive part connected with the rotating unit in the inner side of the bent portion of the CABLEVEYOR. Therefore, the dead space formed in the inner side of the bent portion of the CABLEVEYOR can be used effectively.

1 Claim, 8 Drawing Sheets

//industrial robot having a suspended unit

INDUSTRIAL ROBOT HAVING A SUSPENDED UNIT

CROSS-REFERENCE TO RELATED APPLICATION

This application is based on and claims the benefit of priority from earlier Japanese Patent Application No. 2007-296800 filed on Nov. 15, 2007, the description of which is incorporated herein by reference.

BACKGROUND OF THE INVENTION

1. Technical Field of the Invention

This invention relates to an industrial robot that suspends a suspended unit movably in a straight line on a straight axis that is fixed on a stationary part.

2. Description of the Related Art

In the case where an industrial robot is introduced into a small installation, a perpendicularly intersected type industrial robot is used. This type of the industrial robot has two straight-moving axes that are perpendicularly intersected.

By the way, since a space just under the straight-moving axes is a useless space (or so-called dead space) instead of a workspace in the perpendicularly intersected type industrial robot, it is effective to replace the perpendicularly-intersected type industrial robot having a composition with a suspended unit being suspended on a straight axis.

That is, an effective use of the space just under the straight axis can be attained by suspending a suspended unit as shown in a Japanese Patent Application Laid-Open Publication No. 59-129677 to a straight-moving industrial robot as shown in a Japanese Patent Application Laid-Open Publication No. 54-118056, for example.

However, since the suspended unit is constituted by arranging a drive source and a movable member in the height direction, with the composition that only suspends the suspended unit to the straight axis, the height size of the suspended unit becomes large and thus the whole robot system becomes large.

SUMMARY OF THE INVENTION

The present invention has been made in order to solve the issue described above, and has as its object to provide an industrial robot having a suspended unit with the composition of a suspended unit being suspended from a straight axis, that can attain the compactness of the whole unit even when the parts of the same size as the conventional technology are used.

In the industrial robot having a suspended unit according to a first aspect, there is provided an industrial robot having a suspended unit comprising a straight axis fixed on a stationary part, a suspended unit suspended movably in a straight line on the straight axis, and a cable supporting means having a bent portion with a curved surface located on a side of the straight axis which connects between the straight axis and the suspended unit.

In addition, the suspended unit is provided with a movable member and a drive source that moves the movable member, and the drive source is located on the suspended unit in an inner side of the bent portion.

If the suspended unit moves in the straight-line movement by the drive of a straight axis, the shape of the bent portion of the cable supporting means changes in accordance with the movement of the suspended unit, so that the inner side of the bent portion becomes a dead space where no parts can be arranged.

However, since the drive source is disposed on the suspended unit and moves integrately, the drive source can be arranged in the inner side of the bent portion. Therefore, the dead space formed in the inner side of the bent portion can be used effectively, and the compactness of the whole industrial robot can be attained.

In the industrial robot having a suspended unit according to a second aspect, the cable supporting means is disposed to the direction parallel to the longitudinal direction of the straight axis, and the suspended unit is disposed offset from the axial center of the straight axis so that its center of revolution may be located approximately the center of the industrial robot in its width direction.

DETAILED DESCRIPTION OF THE PREFERRED EMBODIMENTS

With reference to the accompanying drawings, hereinafter will be described a first embodiment of the present invention.

Figure 1:
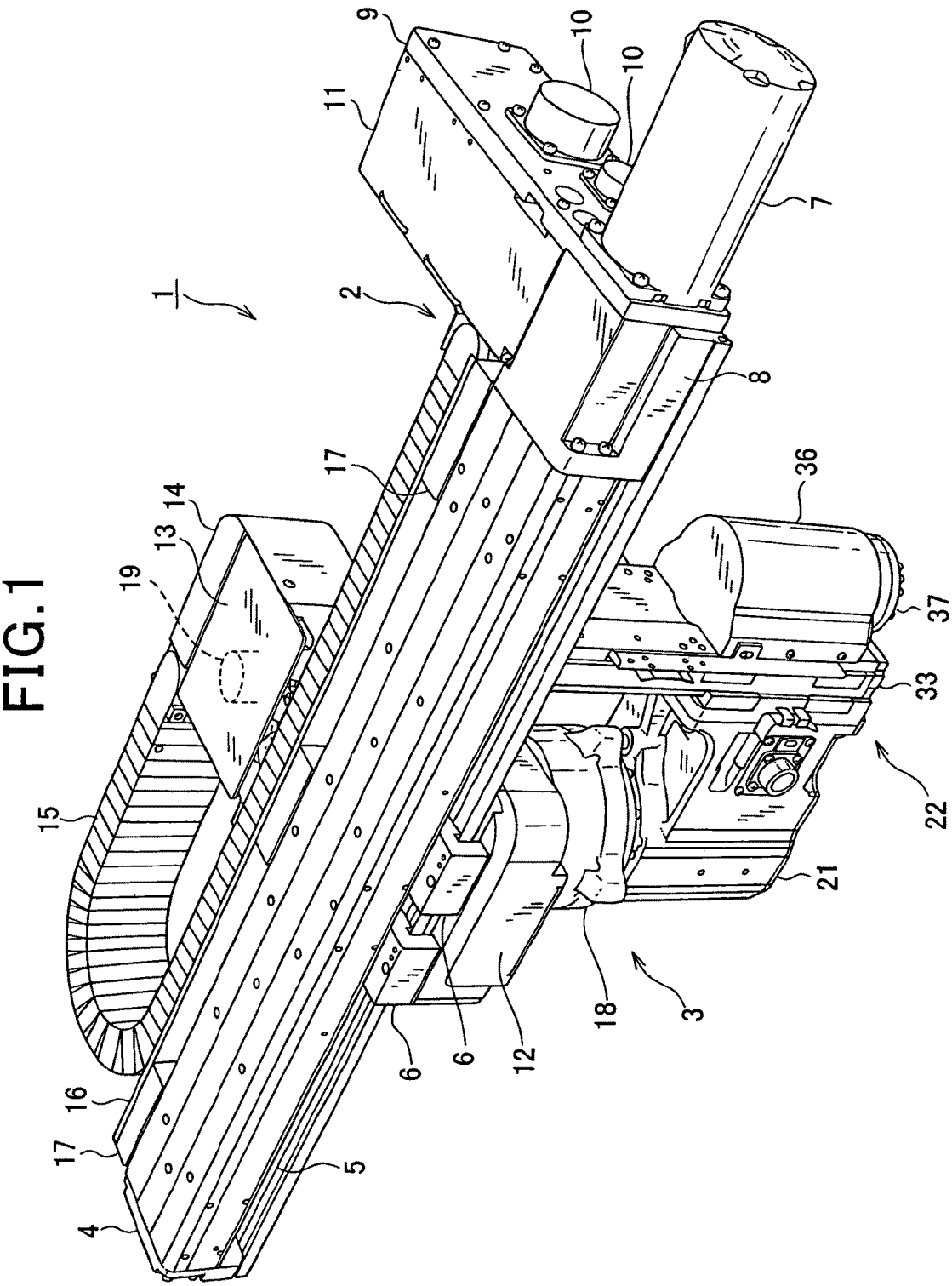
FIG. 1 shows a perspective diagram of an industrial robot having a suspended unit in an embodiment of the present invention.
Figure 2:
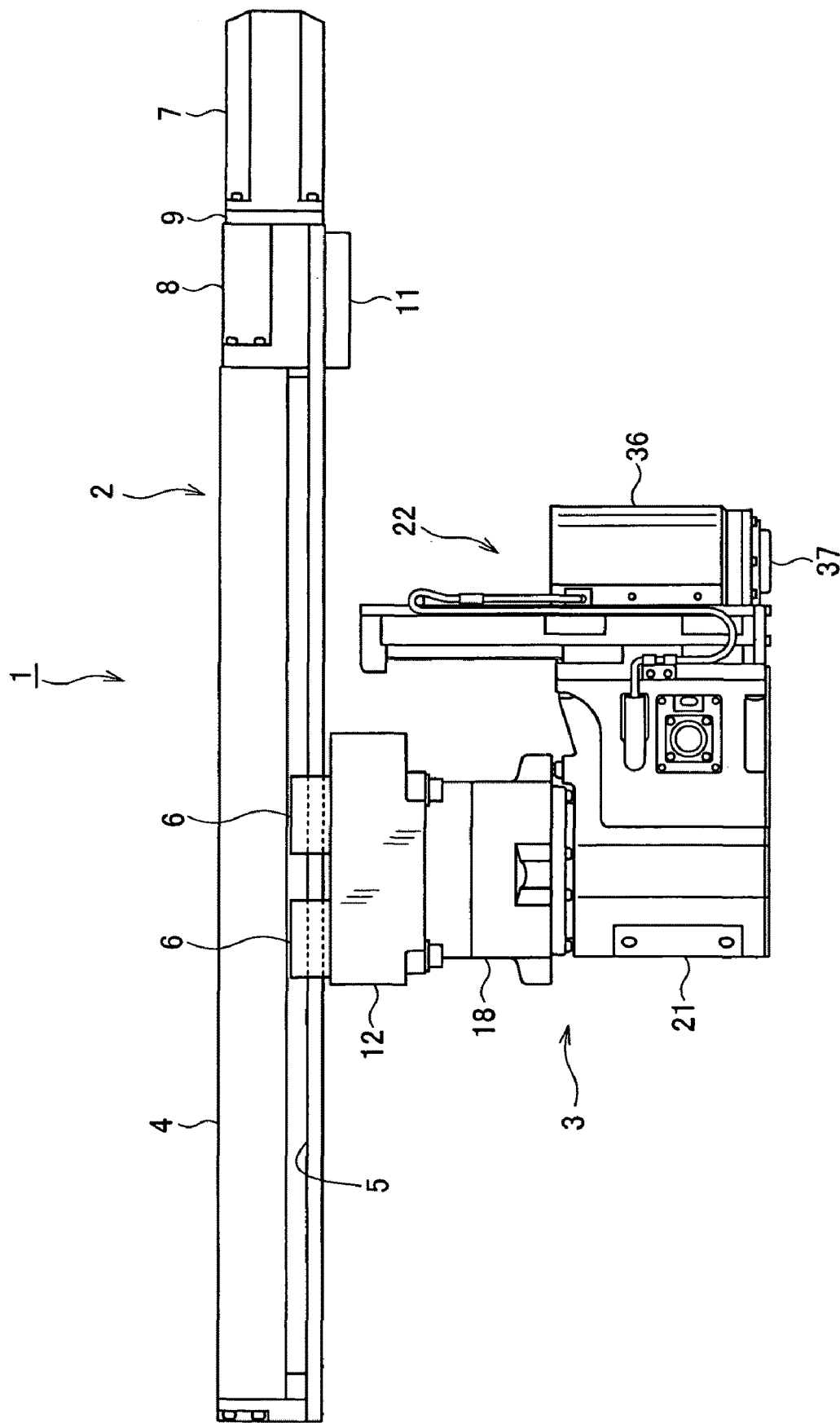
FIG. 2 shows an elevational view of the industrial robot.
Figure 3:
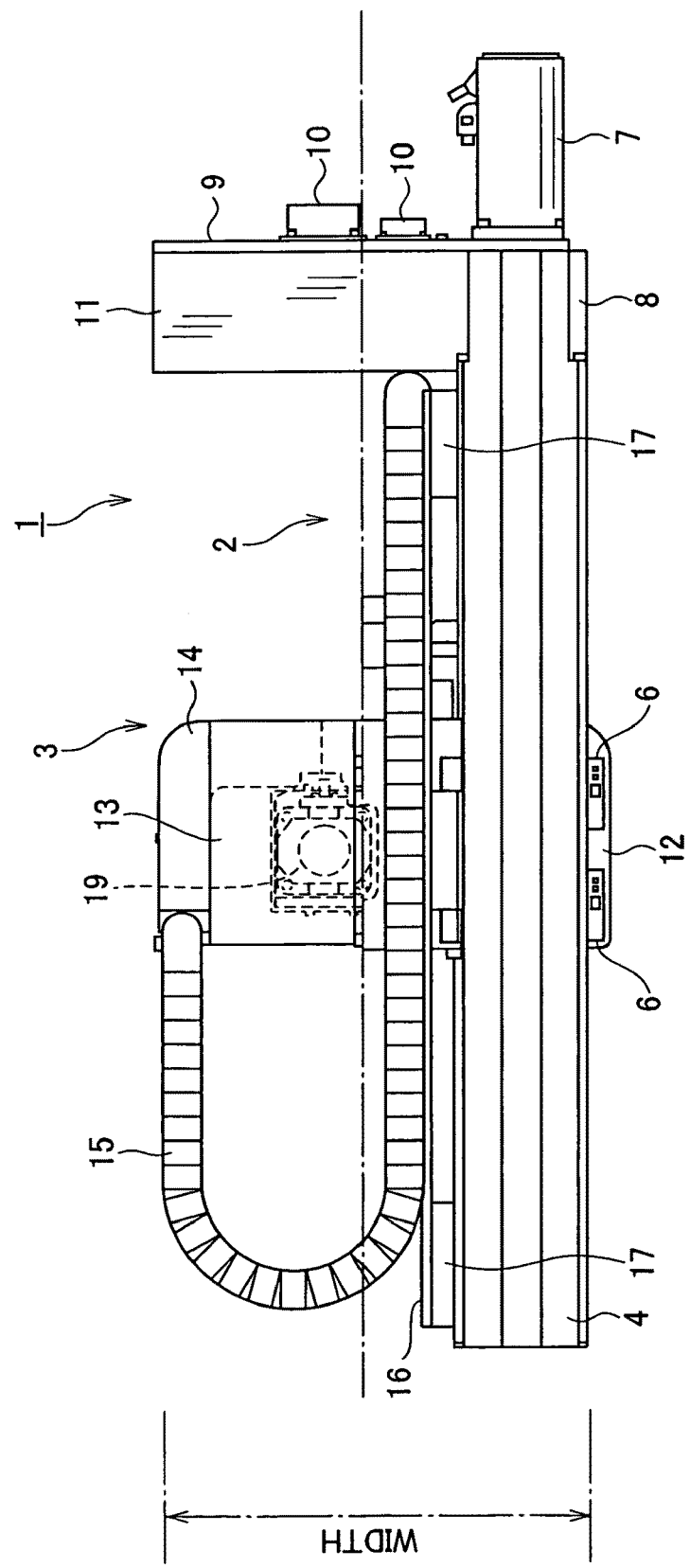
FIG. 3 shows an upper surface view of the industrial robot.

FIG. 1 shows a perspective diagram of an industrial robot, FIG. 2 shows an elevational view of the industrial robot, and FIG. 3 shows an upper surface view of the industrial robot.

By the way, illustrations of cables, compressed air pipes, etc. are omitted in these FIGS. 1, 2, and 3.

The industrial robot 1 comprises a rotating unit (equivalent to a suspended unit) 3 suspended movably in a straight line from the straight-moving unit 2. The industrial robot 1 is installed in a predetermined workspace (not shown) by fixing it to a ceiling (not shown, equivalent to a stationary part) or to a leg part (not shown, equivalent to a stationary part), for example. The industrial robot 1 may be fixed horizontally, vertically or in any direction; however, the industrial robot 1 in this embodiment is fixed horizontally.

The straight-moving unit 2 is constituted mainly with a straight axis 4. A guide rail 5 is formed in the straight axis 4 along its longitudinal direction, and it is equipped with a pair of sliders 6 movably in a straight line along with the guide rail 5. The straight axis 4 is provided with a ball screw (not shown), and the ball screw is screwed to a nut (not shown) that is fixed to the sliders 6. The ball screw is designed to rotate in the state where its rotation is slowed down by a connecting unit 8 by a motor for straight-moving axes 7 (simplified to "motor" hereafter). The sliders 6 move in a straight line with the rotation of the motor 7 along with the guide rail 5.

The motor 7 is fixed to the connecting unit 8 via a base member 9. The base member 9 is horizontally projected from the straight axis 4, and there is provided a box connector 10 on one side of the projected part. There is provided a box 11 on another side of the base member 9 so that a box 11 may become horizontal, and not shown cables (power cables, signal cables) and compressed air tubes are introduced in the box 11 through the box connector 10. A suspension base 12 is engaged with an undersurface of the sliders 6, and the rotating unit 3 is fixed to the suspension base 12.

Figure 4:
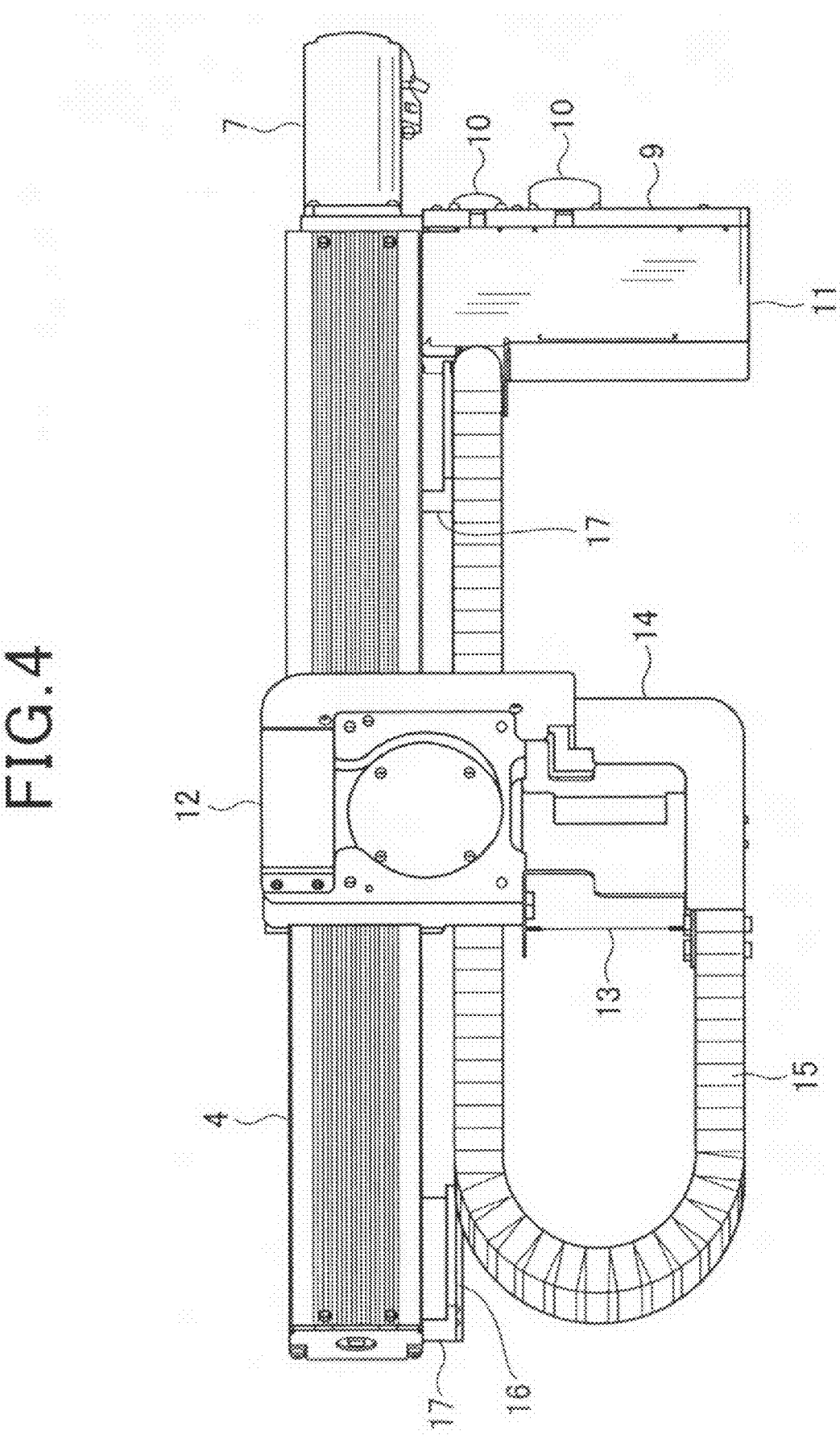
FIG. 4 shows an undersurface side perspective diagram of the industrial robot with a rotating unit removed.

FIG. 4 is a perspective diagram showing an undersurface of the industrial robot 1, and rotating unit 3 is removed for an easy explanation. The suspension base 12 is a member to which the rotating unit 3 is screwed on, and a cover member 13 and an L-shaped cable duct are formed on the side of the suspension base 12 integrately.

An end of a CABLEVEYOR (registered trademark) 15 as a cable supporting means is connected to the box 11, and the CABLEVEYOR 15 is extended to the direction parallel to the longitudinal direction of the straight axis 4 along with the straight axis 4 (i.e., to the horizontal direction). The CABLEVEYOR 15 has a bent portion with a curved surface and connected to the box 11 between the straight-moving unit 2 and the rotating units 3 in the state where the bending direction is parallel to the longitudinal direction of the straight axis 4 (i.e., to the horizontal direction).

A long plate-like maintenance member 16 is fixed to the side of the straight axis 4 via the spacer 17 along with the longitudinal direction of the straight axis 4, and the CABLEVEYOR 15 installed in accordance with the side of the straight axis 4 from the box 11 is touching along with the maintenance member 16.

The CABLEVEYOR 15 is connected to the cable duct 14 with its intermediate part being bent back to the direction parallel to the longitudinal direction of the straight axis 4 (i.e., to the horizontal direction).

The straight-moving unit 2 is constituted as mentioned above, and the rotating unit 3 is fixed to the suspension base 12 that constitutes the straight-moving unit 2. The cables and compressed air tubes that pass through in the CABLEVEYOR 15 and the cable duct 14 are connected with the rotating unit 3. Here, the CABLEVEYOR 15 is arranged so that it may become lower than the upper most position of the industrial robot 1 (when the industrial robot 1 is fixed horizontally as shown in this embodiment).

Figure 5:
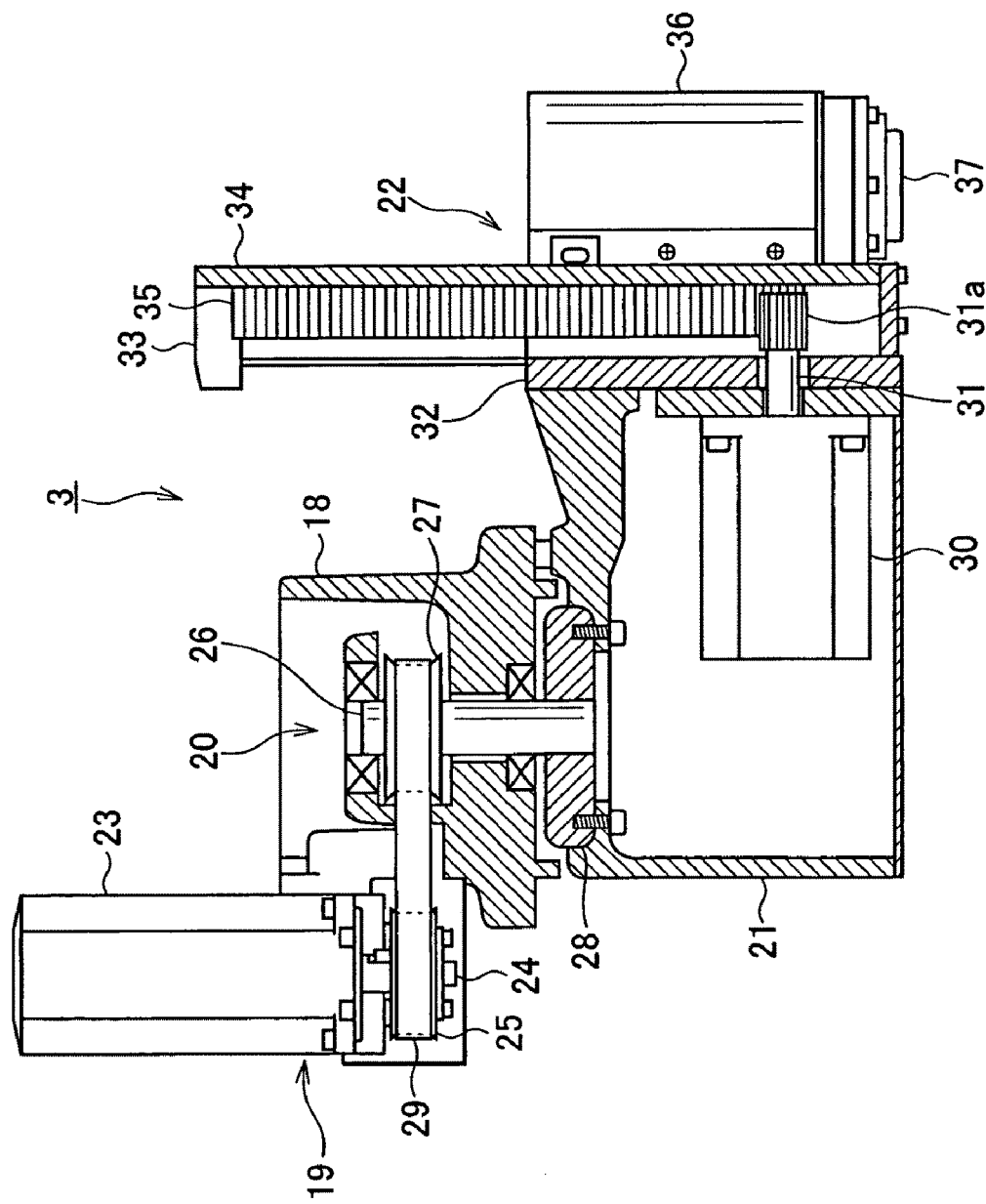
FIG. 5 is a longitudinal sectional view showing the typical structure of the rotating unit.

FIG. 5 is a longitudinal sectional view showing the typical structure of the rotating unit 3. The rotating unit 3 comprises a support part 18, a drive part (equivalent to a drive source) 19, a driven part 20, a rotation arm (equivalent to a movable member) 21, and an elevating part 22. The drive part 19 is installed in the side of the support part 18 side by side, and the driven part 20 is supported rotatably by the support part 18.

The drive part 19 is constituted with a drive pulley 25 attached to a shaft 24 of a rotation motor 23. The driven part 20 is constituted with a driven pulley 27 fixed to the upper end of a shaft 26 supported rotatably by the support part 18 and a revolving member 28 fixed to the lower end of the shaft 26.

The drive pulley 25 and the driven pulley 27 are connected with a drive belt 29, so that the rotation motor 23 rotates the revolving member 28. In this case, the drive part 19 is in a form that its head portion is located in the side of the straight axis 4, and is contained in the cover member 13.

The rotation arm 21 is fixed to the revolving member 28 of the driven part 20. Therefore, the rotation arm 21 revolves so that the rotation arm 21 may become parallel to the longitudinal direction of the straight axis 4 (i.e., to the horizontal direction) with the rotation of the rotation motor 23. There is provided an elevation motor 30 in the rotation arm 21. A pinion gear 31a is disposed at a tip of a shaft 31 of the elevation motor 30.

The elevating part 22 is fixed at a tip of the rotation arm 21. The elevating part 22 comprises a base member 32, a main slider 33 and an accompanying slider 34, and these components are connected each other in a so-called telescopic mechanism. A rack 35 is fixed to the accompanying slider 34, and the pinion gear 31a of the elevation motor 30 is engaged with the rack 35.

The accompanying slider 34 is equipped with another rotation motor 36, and a flange 37 rotates by the rotation motor 36. The flange 37 is designed to equip a grasping device, which is not shown here. In the case where the grasping device equipped on the flange 37 is operated by compressed air, the air is supplied to the grasping device through the compressed air tubes passing inside the CABLEVEYOR 15 according to a movement of a solenoid valve (not shown) for supplying the pressured air to the grasping device.

Figure 6:
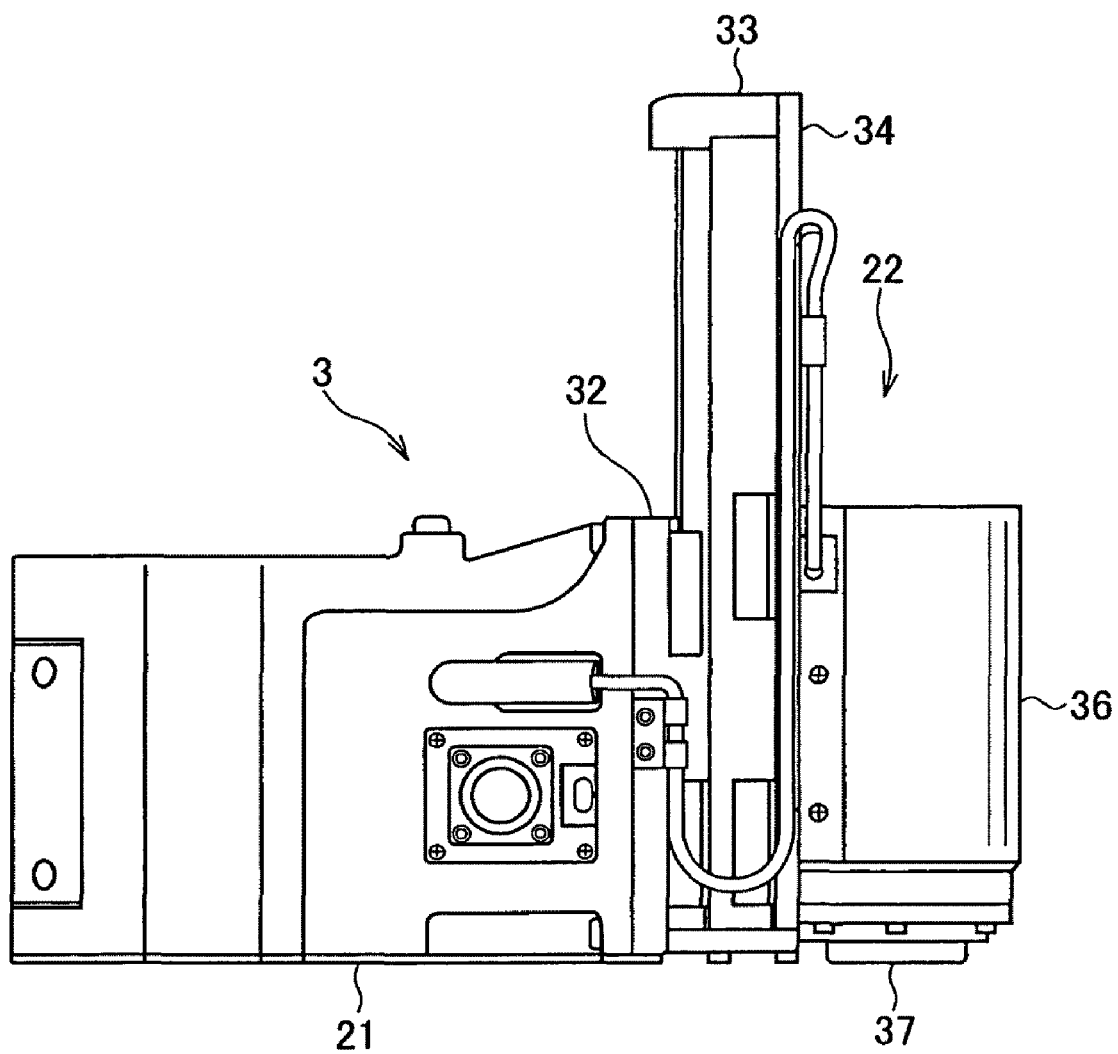
FIG. 6 is a side view of the unit where an elevating part is located in the upper most position.

The main slider 33 and the accompanying slider 34 elevate according to the drive force of the elevation motor 30. That is, in the state where the main slider 33 and the accompanying slider 34 are located in the upper most position, as shown in FIG. 6, the accompanying slider 34 equipped with the rack 35 will descend by rotating the elevation motor 30. In this case, the main slider 33 descends together with the accompanying slider 34 integrately in accordance with the descending of the accompanying slider 34.

Figure 7:
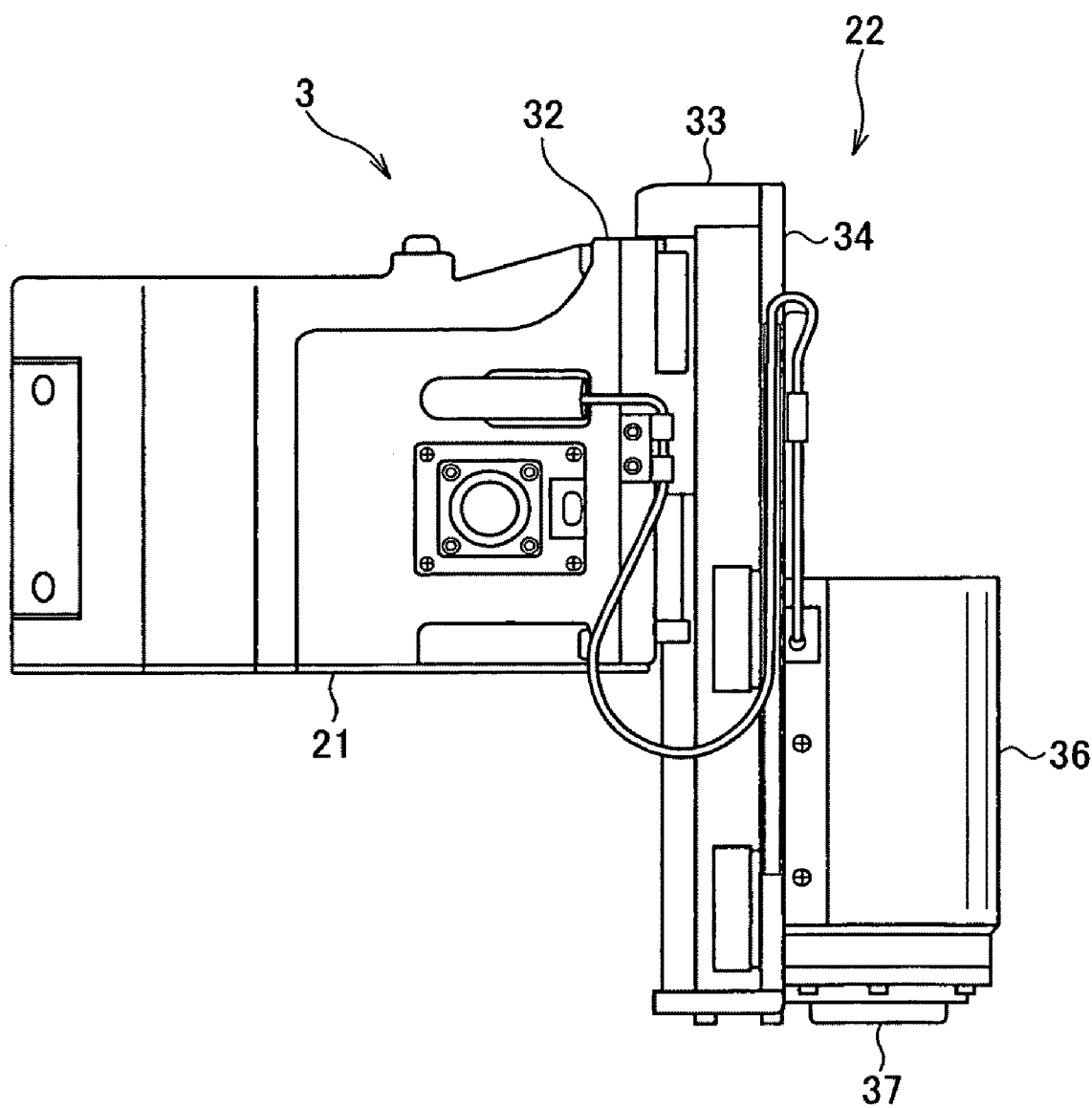
FIG. 7 is a side view of the unit where the elevating part is located in the middle position.
Figure 8:
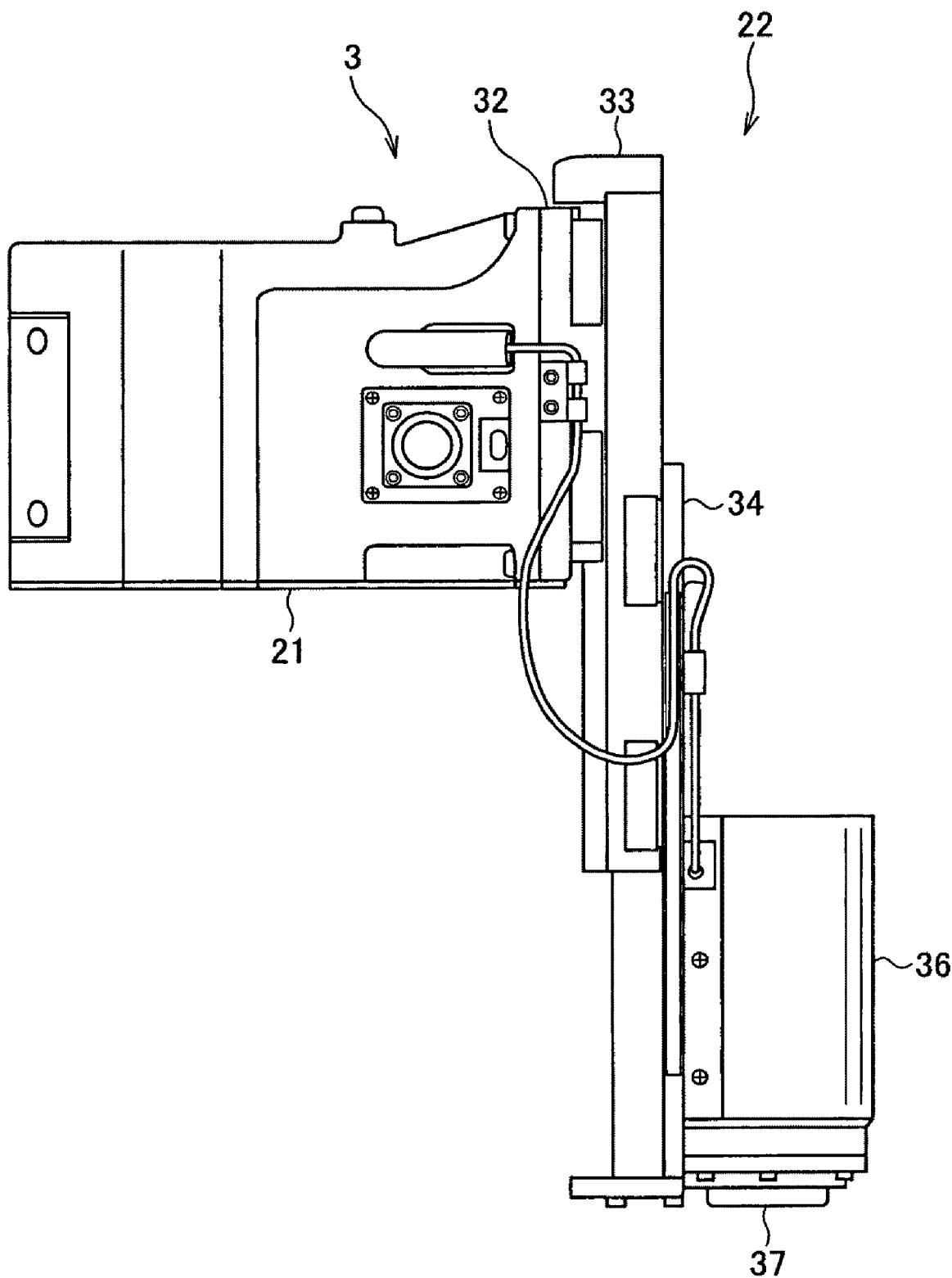
FIG. 8 is a side view of the unit where the elevating part is located in the lower most position.

As shown in FIG. 7, when the main slider 33 descends 100 mm, the base member 32 will suppress the descent of the main slider 33, thus only the accompanying slider 34 descends. As shown in FIG. 8, when the accompanying slider 34 further descends 100 mm more and is located in the lower most position, the main slider 33 will suppress the descent of the accompanying slider 34.

If the elevation motor 30 is rotated in the opposite direction in the state shown in FIG. 8, the accompanying slider 34 will elevate and at the position where the accompanying slider 34 touches the main slider 33, the accompanying slider 34 and the main slider 33 will elevate integrately.

The above-mentioned separate motors 7, 23, 30 and 36, and the solenoid valve for supplying pressured air are controlled by a robot controller (not shown).

In the industrial robot 1 constituted as mentioned above, the drive part 19 is located in the inner side of the bent portion of the CABLEVEYOR 15 at the side of the straight-moving unit 2.

Further, the rotating unit 3 is disposed offset from the axial center of the straight axis 4 so that the center of revolution of the rotation arm 21 may be located at approximately the center of the industrial robot 1 in its width direction.

That is, as shown in FIG. 3, since the width of the industrial robot 1 is set between an end surface of the straight axis 4 and another end surface of the box 11, the center of revolution of the rotating unit 3 is located at approximately the center point of the straight axis 4 and the end surface of the box 11.

Further, the CABLEVEYOR 15 is arranged at a higher position than the elevating part 22 where the elevating part 22 is located in the upper most position.

Now, if the motor 7 (for straight-moving axes) rotates according to the instructions from the robot controller, the rotating unit 3 moves in the straight-line movement in accordance with the straight-line movement of the sliders 6.

At this time, since the end of the CABLEVEYOR 15 connected with the cable duct 14 of the suspension base 12 moves in accordance with the movement of the rotating unit 3, a shape of the bent portion of the CABLEVEYOR 15 changes.

In addition, since the shape of the bent portion of the CABLEVEYOR 15 changes in accordance with the movement of the rotating unit 3, the inner side of the bent portion becomes a dead space where no parts can be arranged.

However, since the drive part 19 located in the side of the straight axis 4 is equipped with the rotating unit 3 and moves integrately in this embodiment, there is no problem occurs by locating the drive part 19 connected with the rotating unit 3 in the inner side of the bent portion of the CABLEVEYOR 15.

According to the present embodiment, the rotating unit 3 is disposed so that the drive part 19, which constitutes the rotating unit 3, is located in the inner side of the bent portion of the CABLEVEYOR 15 in the side of the straight axis 4. Therefore, the dead space formed in the inner side of the bent portion of the CABLEVEYOR 15 can be used effectively, and the compactness of the whole industrial robot 1 can be attained.

Moreover, since the center of revolution of the rotating unit 3 is located approximately the center of the width of the industrial robot 1, a center of the industrial robot 1 and a center of the workspace can be matched approximately so that designing an arrangement of the industrial robot 1 or an instruction for the operation becomes easy.

This invention is not limited to the above-mentioned embodiments, however, and various implementations of modifications are possible within the limits of the essential points of the present invention.

This invention is not limited to the rotating unit 3, but is applicable if the suspended unit has a composition of a drive source and a movable member driven by the drive source. One may use a cable supporting means other than the CABLEVEYOR 15.

Moreover, the CABLEVEYOR 15 may be installed with its bending direction in perpendicular. In this case, the rotation motor 23 is arranged horizontally, and changing the rotation of that rotation motor 23 perpendicularly by using a bevel gear, for example, thus the drive part 19 can be located in the inner side of the bent portion of the CABLEVEYOR 15.

What is claimed is:

1. An industrial robot having a suspended unit robot comprising:
    a straight axis fixed on a stationary part;
    a suspended unit suspended movably in a straight line on the straight axis; and
    a cable supporting means having a bent portion with a curved surface located on a side of the straight axis which connects between the straight axis and the suspended unit;
    wherein the suspended unit is provided with a movable member and a drive source that moves the movable member,
    the drive source is located on the suspended unit in an inner side of the bent portion,
    the cable supporting means is disposed to a direction parallel to a longitudinal direction of the straight axis, and
    the suspended unit is disposed offset from an axial center of the straight axis so that its center of revolution may be located approximately at a center of the industrial robot in its width direction.

* * * * *